US 9,740,696 B2

(12) United States Patent
Oztaskent et al.

(10) Patent No.: US 9,740,696 B2
(45) Date of Patent: *Aug. 22, 2017

(54) PRESENTING MOBILE CONTENT BASED ON PROGRAMMING CONTEXT

(71) Applicant: Google Inc., Mountain View, CA (US)

(72) Inventors: Ant Oztaskent, Surrey (GB); Yaroslav Volovich, Cambridge (GB)

(73) Assignee: Google Inc., Mountain View, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 14/203,229

(22) Filed: Mar. 10, 2014

(65) Prior Publication Data
US 2014/0195557 A1   Jul. 10, 2014

Related U.S. Application Data

(63) Continuation of application No. 12/782,864, filed on May 19, 2010, now Pat. No. 8,694,533.

(51) Int. Cl.
*G06F 7/00* (2006.01)
*G06F 17/30* (2006.01)
(Continued)

(52) U.S. Cl.
CPC .. *G06F 17/30023* (2013.01); *G06F 17/30026* (2013.01); *G06F 17/30038* (2013.01);
(Continued)

(58) Field of Classification Search
CPC ......... G06F 17/30023; G06F 17/30026; G06F 17/30038; G06F 17/30787;
(Continued)

(56) References Cited

U.S. PATENT DOCUMENTS

2003/0021441 A1   1/2003   Levy et al.
2003/0185541 A1 * 10/2003   Green .................. H04N 5/76
                                                        386/250
(Continued)

FOREIGN PATENT DOCUMENTS

CN   WO 2009140819 A1 * 11/2009   ....... G06F 17/30781
JP   2009-303120   12/2009
(Continued)

OTHER PUBLICATIONS

U.S. Appl. No. 13/556,117, filed Jul. 23, 2012, Directed Content Presentation, Liu et al.
(Continued)

*Primary Examiner* — Azam Cheema
(74) *Attorney, Agent, or Firm* — Fish & Richardson P.C.

(57) ABSTRACT

Methods, systems, and apparatus, including computer programs encoded on a computer storage medium, for generating search queries in response to obtaining audio samples on a client device. In one aspect, a method includes the actions of i) receiving audio data from a client device, ii) identifying specific content from captured media based on the received audio data, wherein the identified specific content is associated with the received audio data and the captured media includes at least one of audio media or audio-video media, iii) obtaining additional metadata associated with the identified content, iv) generating a search query based at least in part on the obtained additional metadata, and v) returning one or more search results to the client device, the one or more search results responsive to the search query and associated with the received audio data.

20 Claims, 4 Drawing Sheets

(51) Int. Cl.
 H04N 21/233 (2011.01)
 H04N 21/234 (2011.01)
 H04N 21/266 (2011.01)
 H04N 21/439 (2011.01)
 H04N 21/482 (2011.01)
 H04N 21/658 (2011.01)
 H04N 21/8352 (2011.01)
 H04N 21/84 (2011.01)

(52) U.S. Cl.
 CPC .. *G06F 17/30787* (2013.01); *G06F 17/30876* (2013.01); *H04N 21/233* (2013.01); *H04N 21/23418* (2013.01); *H04N 21/266* (2013.01); *H04N 21/4394* (2013.01); *H04N 21/4826* (2013.01); *H04N 21/4828* (2013.01); *H04N 21/6581* (2013.01); *H04N 21/8352* (2013.01); *H04N 21/84* (2013.01)

(58) Field of Classification Search
 CPC ............ G06F 17/30876; H04N 21/233; H04N 21/23418; H04N 21/4826; H04N 21/4828; H04N 21/6581; H04N 21/8352; H04N 21/84
 See application file for complete search history.

(56) References Cited

U.S. PATENT DOCUMENTS

| | | | |
|---|---|---|---|
| 2005/0058319 | A1 | 3/2005 | Rhoads et al. |
| 2007/0055500 | A1 | 3/2007 | Bilobrov |
| 2007/0250716 | A1 | 10/2007 | Brunk et al. |
| 2008/0049704 | A1 | 2/2008 | Witteman et al. |
| 2008/0066098 | A1 | 3/2008 | Witteman et al. |
| 2008/0256109 | A1* | 10/2008 | Irvin ................. G06F 17/30017 |
| 2008/0256115 | A1 | 10/2008 | Beletski et al. |
| 2008/0271070 | A1 | 10/2008 | Kanojia et al. |
| 2008/0276266 | A1 | 11/2008 | Huchital et al. |
| 2009/0041418 | A1 | 2/2009 | Candelore et al. |
| 2009/0044233 | A1 | 2/2009 | Brandt et al. |
| 2009/0063277 | A1 | 3/2009 | Bernosky et al. |
| 2010/0119208 | A1 | 5/2010 | Davis et al. |
| 2010/0205222 | A1 | 8/2010 | Gajdos et al. |
| 2011/0078172 | A1* | 3/2011 | Lajoie ............... G06F 17/30775 707/769 |
| 2011/0238192 | A1 | 9/2011 | Shah et al. |
| 2011/0289098 | A1 | 11/2011 | Oztaskent et al. |
| 2013/0036011 | A1 | 2/2013 | Roberts et al. |

FOREIGN PATENT DOCUMENTS

| | | |
|---|---|---|
| WO | WO 2009/036435 | 3/2009 |
| WO | WO 2009/100093 | 8/2009 |

OTHER PUBLICATIONS

Office Action issued in Japanese Application No. 2011-111540 on Apr. 6, 2015, 6 pages (with English translation).

DG Announces Pioneering Dual-Screen Video Ad Platform. [online], [retrieved on Jun. 15, 2012], Retrieved from the Internet <URL: http://www.dgitcom/our-company/news-pr/dg-announces-pioneering-dual-screen-video-ad-platform>, 1 page.

Casey, Michael A., et al., "Content-Based Music Information Retrieval: Current Directions and Future Challenges," Proceedings of the IEEE, vol. 96, No. 4, Apr. 2008, 29 pages.

Authorized officer Inigo Deane, Extended European Search Report in Application No. EP 11 16 6420.7, mailed Aug. 5, 2011, 7 pages.

* cited by examiner

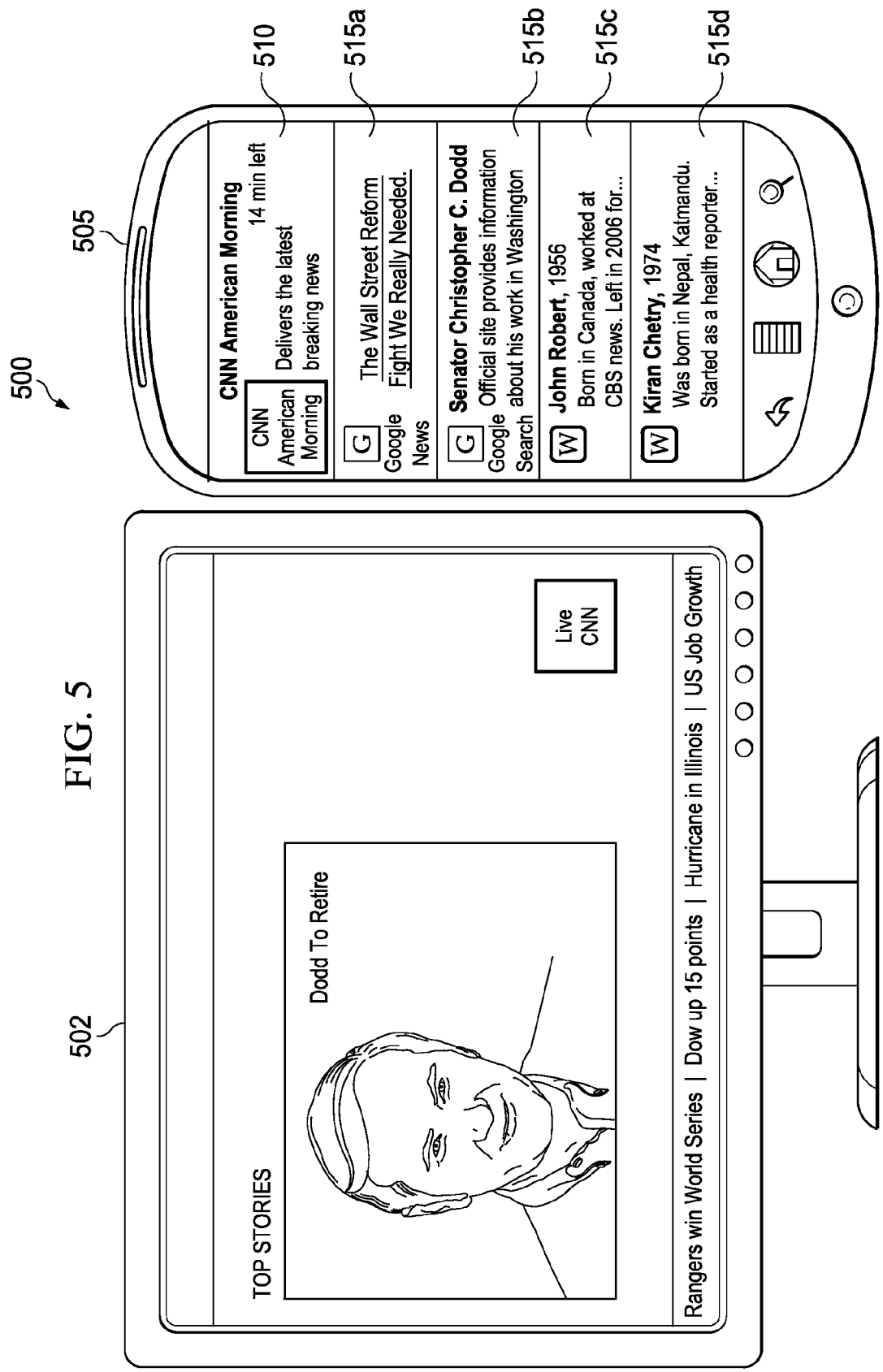

PRESENTING MOBILE CONTENT BASED ON PROGRAMMING CONTEXT

CROSS-REFERENCE TO RELATED APPLICATIONS

This application is a continuation application of and claims priority to U.S. application Ser. No. 12/782,864, filed on May 19, 2010, which is incorporated here by reference.

BACKGROUND

This specification relates to generating a search query in response to obtaining an audio sample.

Search engines allow searching of the Internet for resources, examples of which include web pages, images, video, and audio content. A typical search engine provides a web page for entering search queries. Generally, search queries can be constructed from terms entered into a web page by a user, and searches can be conducted for web pages or other files that contain the terms identified in the search query. Results of a search conducted for a particular query can be ranked and listed on one or more search results web pages.

As mobile devices, including smartphones, netbooks, laptops, and other devices, have become more common, the corresponding use of mobile search engines has increased. For example, users in the home are increasingly performing searches and browsing the internet during television and radio broadcasts, as well as while viewing or accessing recorded media, such as DVDs, Blu-rays, or digital media. Searches related to these broadcasts or viewings may be performed on the users' devices by manually entering search terms associated with the media.

SUMMARY

In general, one innovative aspect of the subject matter described in this specification can be embodied in methods that include the actions of i) receiving audio data from a client device, ii) identifying specific content from captured media based on the received audio data, wherein the identified specific content is associated with the received audio data and the captured media includes at least one of audio media or audio-video media, iii) obtaining additional metadata associated with the identified content, iv) generating a search query based at least in part on the obtained additional metadata, and v) returning one or more search results to the client device, the one or more search results responsive to the search query and associated with the received audio data. Other embodiments of this aspect include corresponding systems, apparatus, and computer programs, configured to perform the actions of the methods, encoded on computer storage devices.

These and other embodiments can each optionally include one or more of the following features. For example, the client device can include a mobile device. The mobile device can include one of a mobile phone, a smartphone, a laptop, a network, or a tablet PC. The client device can include a set-top box associated with a presentation of audio media or audio-video media. Further, the audio data received from the client device includes an audio fingerprint of media recorded at the client device. In some instances, the method further comprises obtaining an audio fingerprint of the audio data. Obtaining the audio fingerprint can include generating an audio fingerprint from the audio data received from the client device. The captured media may include a collection of captured digital television broadcasts, and the method may further comprise i) monitoring at least one digital television channel, ii) extracting an audio stream from each of the at least one digital television channels, iii) generating, for each of the monitored at least one digital television channels, an audio fingerprint from at least a portion of the extracted audio stream, and iv) storing each of the generated audio fingerprints in an audio fingerprint repository, each generated audio fingerprint associated with a unique content identifier. The method may further comprise i) deriving at least one additional set of information associated with each extracted audio stream, ii) generating at least one set of content-related metadata associated with each extracted audio stream based on the derived at least one additional set of information, iii) associating each of the at least one set of content-related metadata with the unique content identifier associated with the generated audio fingerprint associated with the corresponding extracted audio stream, and iv) storing each of the at least one set of content-related metadata in a metadata repository. In some instances, identifying specific content from captured media can include i) matching an audio fingerprint generated from the audio data received from the client device with at least one audio fingerprint stored in the audio fingerprint repository and ii) identifying the unique content identifier associated with the at least one audio fingerprint stored in the audio fingerprint repository, while obtaining additional metadata associated with the identified content includes retrieving content-related metadata associated with the identified unique content identifier from the metadata repository.

Another aspect of the subject matter described in this specification can be embodied in a computer storage medium encoded with a computer program, the program comprising instructions that when executed by data processing apparatus cause the data processing apparatus to perform operations comprising i) receiving audio data from a client device, ii) identifying specific content from captured media based on the received audio data, wherein the identified specific content is associated with the received audio data and the captured media includes at least one of audio media or audio-video media, iii) obtaining additional metadata associated with the identified content, iv) generating a search query based at least in part on the obtained additional metadata, and v) returning one or more search results to the client device, the one or more search results responsive to the search query and associated with the received audio data.

These and other embodiments can each optionally include one or more of the following features. For example, the client device can include a mobile device. The mobile device can include one of a mobile phone, a smartphone, a laptop, a network, or a tablet PC. The client device can include a set-top box associated with a presentation of audio media or audio-video media. Further, the audio data received from the client device includes an audio fingerprint of media recorded at the client device. In some instances, the instructions may cause the data processing apparatus to perform operations further comprising obtaining an audio fingerprint of the audio data. Obtaining the audio fingerprint can include generating an audio fingerprint from the audio data received from the client device. The captured media may include a collection of captured digital television broadcasts, and when executed the instructions may cause the data processing apparatus to perform operations further comprising i) monitoring at least one digital television channel, ii) extracting an audio stream from each of the at least one digital television channels, iii) generating, for each of the monitored at least one digital television channels, an audio fingerprint from at least a portion of the extracted audio stream, and iv) storing each of the generated audio fingerprints in an audio fingerprint repository, each generated audio fingerprint associated with a unique content identifier. The instructions may cause the data processing apparatus to perform operations further comprising i) deriving at least one additional set of information associated with each extracted audio stream, ii) generating at least one set of content-related metadata associated with each extracted audio stream based on the derived at least one additional set of information, iii) associating each of the at least one set of content-related metadata with the unique content identifier associated with the generated audio fingerprint associated with the corresponding extracted audio stream, and iv) storing each of the at least one set of content-related metadata in a metadata repository. In some instances, identifying specific content from captured media can include i) matching an audio fingerprint generated from the audio data received from the client device with at least one audio fingerprint stored in the audio fingerprint repository and ii) identifying the unique content identifier associated with the at least one audio fingerprint stored in the audio fingerprint repository, while obtaining additional metadata associated with the identified content includes retrieving content-related metadata associated with the identified unique content identifier from the metadata repository.

Another aspect of the subject matter described in this specification can be embodied in a system comprising i) one or more front-end servers adapted to receive one or more sets of audio data from one or more client devices, ii) one or more match servers adapted to identify a set of program data from a plurality of sets of program data, wherein each set of program data corresponds to one or more captured media programs, based on the audio data, iii) one or more service information servers adapted to store additional information associated with captured media programs and identify specific additional information associated with the identified set of program data, and iv) one or more search query builder servers adapted to generate a search query based at least in part on the identified specific additional information associated with the identified program data, where the one or more front-end servers further adapted to send at least one search query result identified based on the generated search query to the one or more client devices.

These and other embodiments can each optionally include one or more of the following features, alone or in combination. For example, the one or more front-end servers may be further adapted to obtain an audio fingerprint based on the one or more sets of received audio data, and the one or more match servers may be further adapted to compare the obtained audio fingerprint with a plurality of program data-based audio fingerprints and identify at least one of the plurality of program data-based audio fingerprints matching the obtained audio fingerprint. The system may further comprise one or more search engine servers adapted to receive the generated search query and identify at least one search query result responsive to the generated search query. In some instances, the one or more client devices may include a mobile phone, a smartphone, a laptop, a network, or a tablet PC.

Another aspect of the subject matter described in this specification can be embodied in a method that include the actions of i) obtaining an audio sample from at least one media source at a client device, ii) transmitting audio data associated with at least a portion of the audio sample from the client device to a non-keyword-based search system, iii) receiving a set of search results associated with the transmitted portion of the audio data at the client device, wherein the set of search results are generated at the non-keyword-based search system by identifying media programming associated with the obtained audio sample using the transmitted audio data, selecting one or more search terms based on the identified media programming, and submitting the one or more search terms to a search engine, and iv) presenting the set of search results at the client device.

These and other embodiments can each optionally include one or more of the following features, alone or in combination. For example, the at least one media source can include a local media source, and obtaining the audio sample from at least one media source at the client device can include recording ambient audio associated with the local media source. The at least one media source can include at least one of a television broadcast, a radio broadcast, an Internet-based multimedia presentation, a DVD presentation, or a Blu-ray presentation. In some instances, the non-keyword-based search system includes one or more servers, identifying media programming associated with the obtained audio sample using the transmitted audio data includes obtaining additional metadata associated with the identified media programming at the non-keyword-based search system, selecting one or more search terms based on the identified media programming includes generating a search query based at least in part on the obtained additional metadata at the non-keyword-based search system, and receiving a set of search results associated with the transmitted portion of the audio data at the client device includes transmitting a set of search results responsive to the generated search query from the non-keyword-based search system to the client device. The client device can include a mobile device. The mobile device can include one of a mobile phone, a smartphone, a laptop, a network, or a tablet PC. In some instances, the method further comprises obtaining an audio fingerprint of at least a portion of the audio sample at the client device, wherein the transmitted audio data associated with the at least a portion of the audio sample includes the obtained audio fingerprint.

Another aspect of the subject matter described in this specification can be embodied in a computer storage medium encoded with a computer program, the program comprising instructions that when executed by data processing apparatus cause the data processing apparatus to perform operations comprising i) obtaining an audio sample from at least one media source, ii) transmitting audio data associated with at least a portion of the audio sample to a non-keyword-based search system, iii) receiving a set of search results associated with the transmitted portion of the audio data, wherein the set of search results are generated at the non-keyword-based search system by identifying media programming associated with the obtained audio sample using the transmitted audio data, selecting one or more search terms based on the identified media programming, and submitting the one or more search terms to a search engine, and iv) presenting the set of search results.

These and other embodiments can each optionally include one or more of the following features, alone or in combination. For example, the at least one media source can include a local media source, and obtaining the audio sample from at least one media source can include recording ambient audio associated with the local media source. The at least one media source can include at least one of a television broadcast, a radio broadcast, an Internet-based multimedia presentation, a DVD presentation, or a Blu-ray presentation. In some instances, the non-keyword-based search system includes one or more servers, identifying media programming associated with the obtained audio sample using the transmitted audio data includes obtaining additional metadata associated with the identified media programming at the non-keyword-based search system, selecting one or more search terms based on the identified media programming includes generating a search query based at least in part on the obtained additional metadata at the non-keyword-based search system, and receiving a set of search results associated with the transmitted portion of the audio data includes transmitting a set of search results responsive to the generated search query from the non-keyword-based search system. The computer storage medium can include a mobile device. The mobile device can include one of a mobile phone, a smartphone, a laptop, a network, or a tablet PC. In some instances, the program comprising instructions that when executed by data processing apparatus cause the data processing apparatus to perform operations further comprises obtaining an audio fingerprint of at least a portion of the audio sample, wherein the transmitted audio data associated with the at least a portion of the audio sample includes the obtained audio fingerprint.

Particular embodiments of the subject matter described in this specification can be implemented so as to realize one or more of the following advantages. A convenient non-keyword-based search interface driven by currently viewed content or programming is provided. Further, software and methods are provided that understand the content of a broadcast or programming being viewed (or listened to) by a user in real time, and, in response, provide access to services or information that directly complement and enhance the content to provide a richer user experience. In television-based embodiments, it is possible to perform rapid and relevant searches associated with current programs to provide additional context to the content, as well as additional information. Further, advertisers can use the described software and methods for better monetization of their search ads, as users can be automatically presented with links or other information associated with programming or other content, and users interested in a particular advertisement can quickly retrieve additional and/or supplementary information regarding the advertised products with minimal required interactions. Further, information embedded within or associated with a particular broadcast and/or advertisement, such as a uniform resource locator or business information, can be quickly accessed through use of the described methods and systems.

Particular embodiments of the systems and methods described in the present disclosure may be particularly attractive for use on smartphones and other mobile devices, as the devices themselves are personal devices and can be used easily in conjunction with the use of a secondary broadcast device, such as a television or radio. Specifically, smartphones can be used for "quick browsing" without interrupting or distracting the user from the broadcast. Additionally, the size and accessory constraints associated with mobile devices (e.g., a lack of or a difficult to use physical keyboard on the mobile device) means that audio-based searches provide convenience and ease to integrating the mobile devices into various use cases. Additionally, the audio-based search of the present embodiments provide a richer set of search results due to the increased context and metadata associated with the search based on the various sources of information included in the back-end search.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flowchart illustrating an example method for capturing broadcast information and populating repositories of audio fingerprints and content-related metadata.

FIG. 5 is an example illustration of search results provided to a client device on a continuous or periodic basis using one or more example methods of the present disclosure.

Like reference numbers and designations in the various drawings indicate like elements.

DETAILED DESCRIPTION

Figure 1:
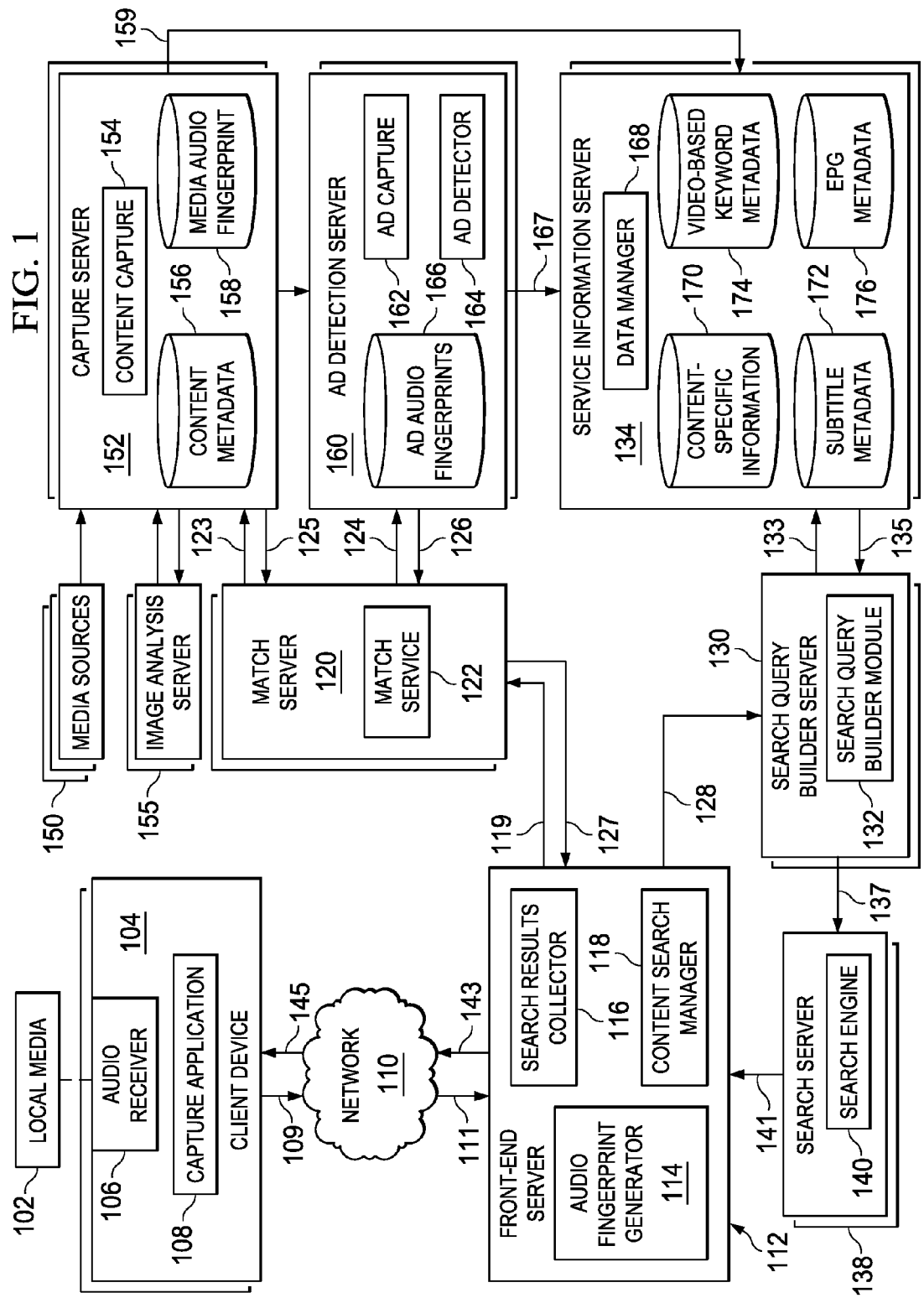
FIG. 1 is a schematic diagram of an example system for generating a search query relevant to captured media in response to an audio-based search request from a client device.

FIG. 1 is a schematic diagram of an example system for generating a search query relevant to captured media in response to an audio-based search request from a client device. The system 100 includes one or more client devices 104, a local media source 102 local to the client device 104, a network 110, a front end server 112, a match server 120, a capture server 152, an ad detection server 160, a service information server 134, a search query builder server 130, a search server 138, and at least one media source 150 associated with the capture server 152. Communications throughout system 100 can be performed via the network 110. For instance, the client device 104 and the front-end server 112 can communicate by way of the network 110. Additionally, and while not illustrated in FIG. 1, the various other illustrated components can also communicate by way of the network 110 (e.g., the front-end server 112 and the match server 120, the capture server 152 and the service information server 134, etc.). The network 110 can include one or more local area networks (LANs), a wide area network (WAN), such as the Internet, a wireless network, such as a cellular network, or a combination of all of the above. In general, the client device 104 communicates with the front-end server 112 to perform non-keyword searches based on audio information associated with the local media source 102 local to or associated with the client device 104.

The client device 104 may be any suitable device associated with a user that is capable of capturing audio information associated with a broadcast, programming, or other media. For example, the client device 104 can be a mobile device, such as a mobile phone, a smart phone, a tablet computer, a netbook, a laptop, or any other type of mobile device. Still further, the client device 104 can be a relatively immobile device, such as a desktop computer, a set-top television tuner or digital video recorder, a personal video recorder, or any other suitable type of computing device. In some embodiments, the client device 104 can capture ambient audio from a local media source 102 through an audio receiver 106 internal to or external and associated with the client device 104. The audio receiver 106 can be, for example, an internal microphone included within a device, such as a smart phone or tablet computer, as well as an external microphone connected to and/or associated with a device that does not include its own audio receiver 106. In still other instances, the client device 104 may capture audio data from media being executed, listened to, or watched on the client device 104 itself, such as streaming video, audio, or other multimedia. Therefore, the local media 102 can be any source of audio data associated with programming or media, including live television programs, recorded television programs, DVDs, Blu-rays, streaming media, radio broadcasts (or recordings thereof), or any other suitable media.

The client device 104 may include an audio capture application 108 that allows the client device 104 to record ambient (or internal) audio and process that audio information to initiate a non-keyword-based search request. In some instances, the audio capture application 108 may provide an interactive user interface (UI) through which the user can choose to record audio samples from the local media source 102 and submit a search associated with the recorded data. In some instances, the audio capture application 108 can be launched or begun by pressing a single key or button on the client device 104, such as an executable icon on the client device's 104 home screen, or by a button within the UI of the capture application 108 that signals for the application 108 to capture and transmit an audio sample to the front-end server 112. Upon activation, the audio capture application 108 can record audio data for predetermined time periods when activated (e.g., seven to ten seconds), the time periods estimated or calculated to provide a suitable amount of audio information to identify the captured local media 102. Alternatively, the audio capture application 108 may be recording audio information on a continuous or semi-continuous basis. In those instances, when a user of the client device 104 elects to or initiates a search, a portion of the recorded audio can be used as the audio sample sent to the front-end server 102. In one example, the last ten seconds of the recording prior to the search's initiation can be used.

As illustrated by arrows 109 and 111, the audio sample is sent to the front-end server 112 via network 110. In some instances, the audio sample sent to the front-end server 112 by the client device 104 may include device-specific (e.g., the current location or type of the client device 104) and/or user-specific information (e.g., a user ID, customized user search preferences, user profile and demographic information, etc.). Further, the audio sample sent to the front-end server 112 may also include an audio fingerprint of the recorded audio sample. An audio fingerprint is a unique digital representation generated from an audio signal (here, the recorded audio sample) that can be used to identify other similar or identical audio samples. In some embodiments, the audio fingerprint of the recorded portion of the local media 102 is used to compare and identify, via the various components of the system 100, the media or programming currently captured at the client device 104. In some embodiments where the audio fingerprint of the recorded portion of the local media 102 is generated at the client device 104, only the audio fingerprint may be sent to the front-end server 112.

The front-end server 112 receives the audio data from the network 110 (as illustrated by arrow 111). In some instances, only a raw audio sample may be received at the front-end server 112. In those instances, an audio fingerprint generator application 114 can be used to generate the audio fingerprint of the received audio sample. If the audio data received from the client device 104 includes the audio fingerprint of the audio sample, the audio fingerprint generator application 114 may not be used. The audio data received from the client device 104 generally represents a request (and may, in some cases, be included in a specific request) to determine the content of the audio sample and prepare and execute a search query associated with that content. In the illustrated system 100, the front-end server 112 includes a content search manager 118, which may be an application used to manage or direct the content identification process. As illustrated by arrow 119, the front-end server 112 (or the content search manager 118) sends (or forwards) the audio fingerprint to the match server 120.

The match server 120 compares the audio fingerprint from the audio sample received from the client device 104 to audio fingerprints from captured content. As illustrated in FIG. 1, this comparison is performed by a match service 122, which accesses one or more audio fingerprint repositories associated with audio samples captured and/or collected from one or more media sources 150. In FIG. 1, the match service 122 compares the audio fingerprint received from the client device 104 to a repository of captured media audio fingerprints 158 (stored, in this example, at a capture server 152, and illustrated by arrow 123), as well as to a repository of ad-related audio fingerprints 166 (stored, in this example, at an ad detection server 160, and illustrated by arrow 124). The match service 122 can search any suitable repository of audio fingerprints, including a repository of audio fingerprints local to the match server 120, as well as other repositories stored external to, or not illustrated in, system 100. Further, multiple instances of the match service 122 (as well as multiple match servers 120) may be employed in system 100 to perform audio fingerprint matching services for system 100. As described, the match service 122 compares the audio fingerprint received from the client device 104 to the audio fingerprints of the one or more associated repositories to generate a fingerprint match, or a set of possible fingerprint matches. Each audio fingerprint determined to be a match (or a possible match) to the client device's 104 audio sample may be associated with a unique identifier, such as a content ID or other identifying value. As illustrated in FIG. 1, the unique identifiers associated with the one or more (possible) matches, as well as any other relevant information, are returned to the match service 122 from the capture server 152 and the ad detection server 160 (illustrated by arrows 125 and 126, respectively). Information on potential matches from any other searched repositories is also returned to the match service 122. The match service 122 may determine the best match of each of the potential matches. In some instances, the matching algorithm performed by the match service 122 may provide scores or relative confidence levels of the possible matches. In some instances, a single audio fingerprint may be identified as matching that of the audio fingerprint associated with the client device's 104 captured audio sample. In other instances, two or more audio fingerprints may be closely ranked or rated by the match service's 122 algorithm. In the embodiment of FIG. 1, a single audio fingerprint (and therefore, a specific piece of content) from the various repositories is selected as the most likely (and, in some cases, the only) match to the client device's audio fingerprint. In alternative embodiments, multiple audio fingerprints (and therefore, multiple sets of content) may be returned by the match service 122.

Once an audio fingerprint match is selected and the associated identifier is retrieved, the match service 122 returns the associated content identifier to the front-end server 112 (as illustrated by arrow 127), where the information is collected and processed by the content search manager 118. The content search manager 118 then sends the content identifier to the search query builder server 130 (as illustrated by arrow 128), where the content identifier is used (for instance, by a search query builder module 132 to retrieve information associated with the content identifier from a service information server 134 (as illustrated by arrow 133). In some instances, the match service 122 may interact directly with the service information server 134 to retrieve information associated with the content identifier, such as metadata associated with the identified content, and related to different portions of the information associated with the captured media sources 150, including subtitle metadata 172, electronic programming guide (EPG) metadata 176, and video-based keyword metadata 174, among others. In some instances, specific content may be associated with sponsored or specific information stored in the service information server 134. For example, an advertisement may be associated with a particular website, with the particular website linked or associated with the unique identifier of the identified content. When the identified content represents the most likely match from the match service 122, the specifically-associated materials and information may automatically be included in the results returned to the client device 104. In some instances, the specifically-associated materials and information may be provided by the broadcasters or other persons or entities associated with the content, including advertisers. As illustrated in FIG. 1, that information can be stored in the content-specific information repository 170 of the service information server 134. Metadata associated with the identified content can be collected and retrieved from the service information server 134 using the unique identifier associated with the matched audio fingerprint. In some instances, the service information server 134 may include a data manager 168 (such as a relational database management system (RDBMS) compatible with the repositories stored at the service information server 134) which can be used to perform queries on the stored metadata to return information related to the specified content identifier.

As illustrated by arrow 135, the metadata and information associated with the content identifier is sent to the search query builder module 132, which uses the received data to build one or more search queries related to the current content associated with the audio sample captured by the client device 104, as well as that content's context as determined from the information retrieved from the service information server 134. Once the relevant search query or queries are generated, the search query builder module 132 provides those queries to the search server's 138 search engine 140 (as illustrated by arrow 137), which searches one or more search repositories and indexes for results responsive to the search queries, and therefore, associated with the identified content and the content's contextual information. The search engine 140 can be a general search engine and can perform searches based on the search query or queries provided by the search query builder module 132, as well as any other search inputs that are provided to the search engine 140. Alternatively, the search engine 140 may be used exclusively with the illustrated system 100. In some embodiments, the search results returned by the search engine 140 may be personalized for a particular user based on information associated with the client device 104 and its user (e.g., user search histories, previous user interaction selections, user settings, user profiles, client device types, user location, and other information of interest to the user, among other user or client device 104 personalization data). In addition, context-relevant and sponsored advertisements may be included with the search results for monetization purposes.

As illustrated by arrow 141, the results of the search are provided to the front-end server 112. The front-end server 112 (or here, the search results collector 116) generates the search results set (as well as any content-specific information) into a format appropriate for sending the results back to the client device 104. These search results may be formatted, for instance, as hypertext markup language (HTML) content that can allow a browser at the client device 104 to display the search results. The formatted results are sent to the client device 104 via the network 110 (as illustrated by arrows 143 and 145). In some instances, the search results can be displayed within the audio capture application 108, while in other instances, the search results can be displayed by a web browser or other software at the client device 104.

The above describes FIG. 1 from the perspective of the client device's audio capture functionality, the corresponding identification of the captured content, and the generation and execution of the search query associated with the captured content. FIG. 1 also illustrates multiple components illustrating how the information associated with the various media types is captured.

As further illustrated in FIG. 1, audio and other information from one or more media sources 150 is captured by the system 100, such as by the capture servers 152 and the ad detection servers 160. The capture servers 152 can be associated with, connected to, or communicably coupled to one or more media sources 150. The media sources 150 may include, for example, television content (e.g., digital television broadcasts or over-the-air broadcasts), radio broadcasts, Internet-streaming or -based multimedia, as well as recorded media, such as DVDs, Blu-rays, and other types of media. The system 100 may include a plurality of capture servers 152, each capture server 152 associated with one or several media sources 150. For example, one capture server 152 may be dedicated to capturing several television channels on one "multiplex" or "transport stream" concurrently (e.g., 5-10 channels per capture server 152). Capture servers 152 may be provided in any location capable of receiving and viewing the associated media. In some instances, capture servers 152 may be located in different countries and associated with media sources 150 associated with that location. For example, a first set of capture servers 152 may be located in a first country, a second set of capture servers 152 may be located in second country, and a third set of capture servers 152 may be located in a third country, each capturing media specific to those countries or associated regions.

The capture server 152 includes a content capture application 154 associated with each "transport stream" to process and extract content from the media sources 150. Each channel of the transport stream is processed by the content capture application 154, potentially in real-time, to capture audio fingerprints associated with the content, as well as additional information included or associated with the content. For example, live digital television-based content is processed by the content capture application 154 by extracting various portions associated with the media stream, including (1) the audio stream associated with the content, (2) a subtitle stream associated with the content, (3) a video stream associated with the content, and (4) a set of electronic program guide (EPG) data included within the media stream.

The content capture application 154 uses an audio fingerprinting algorithm (e.g., a "forgiving hash" algorithm) and engine to create audio fingerprints associated with the captured audio stream. As illustrated in FIG. 1, the audio fingerprints of the captured media can be stored local to the capture server 152 in the media audio fingerprint repository 158, in which a unique identifier is applied to and associated with the captured content. In some instances, the audio fingerprints of the audio stream can be sent to the match server 120 for storage and/or comparison against audio fingerprints associated with audio samples captured at client devices 104. Still further, the media audio fingerprint repository 158 may be stored in a separate component or repository from the capture server 152, e.g., a common fingerprint repository (not illustrated). When the match service 122 attempts to identify matching audio fingerprints, the match service 122 may search or use the audio fingerprints from the one or more common fingerprint repositories, as opposed to the fingerprints stored at the capture server 152.

The content capture application 154 can also extract information associated with subtitles included with the content received at the capture server 152. In some instances, the subtitles may be a text-based stream of information (e.g., ATSC closed captioning), while in other instances, the subtitles may be an image-based stream of information (e.g., DVB-SUB subtitles in Europe which are bitmap-based). If the subtitle information is text-based, keywords and other information associated with the subtitles may be retrieved from the extracted subtitles, and stored in a local repository, such as the content metadata repository 156, or can be sent to the service information server 134, where the subtitle metadata (and related information) can be stored in the subtitle metadata repository 172. The unique identifier of the content associated with the specific metadata can be included in the stored information, allowing quick access to the metadata and other information when needed or requested. If the extracted subtitles are in an image-based form (e.g., a bitmap), the content capture application 154 can use optical character recognition to recognize and capture the subtitle metadata. Still further, if no subtitles are included in from the media source stream, a voice-to-text conversion can be performed to convert the audio information into subtitle-like data. Voice-to-text conversion can be used to obtain information similar to that obtained when processing extracted subtitles, and may, in some cases, be stored in the same subtitle metadata repository 174 or any other repository or location.

The content capture application 154 can use the extracted video stream associated with the captured content to perform additional processing. In one example, snapshots of the video stream may be taken at periodic intervals to obtain one or more still images associated with the captured content. Those still images can be sent to an image analysis server 155, and one or more video-based keywords can be generated. For example, text, logos, and other information included with the still images can be used to generate additional metadata for use in the illustrated system 100, using OCR techniques or other image-related data extraction methods, including facial recognition of persons within the image or object recognition for items, landmarks, and locations associated identified within the image. Once a set of video-based keywords is generated, the image analysis server 155 can return the set of video-based keywords to the content capture application 154. The content capture application 154 can then store the video-based keywords locally within the content metadata repository 156, or send the video-based keywords to a video-based keyword metadata repository 174 at the service information server 134. In either instance, the video-based keywords can be associated with the unique content identifier to allow future associations between identified content and associated metadata to be made when searches are requested or performed. For captured content that is not associated with video or images, no video-based keywords may be generated.

The content capture application 154 can also extract information from EPG data embedded within or included with the media source stream. Additionally, the EPG data may also be provided by or received directly from third parties such as publishers or broadcasters. The directly-provided data may be supplied as XML or any other type of data files, and may be received using an electronic messaging standard, one or more APIs associated with the system 100, or any other format and method of delivery. By receiving information directly from third parties, those third parties may be able to publish data specifically intended for display through the systems and methods described in the present application. For digital television, the EPG information can provide information regarding upcoming programming and program information for each channel within a transport stream. The EPG information may include a specific time period (e.g., 8 to 16 days) of program information for a each captured channel, as well as real-time updates to (or derivations from) the EPG information due to current programming. For example, the updated information may be used to determine whether a live program or televised sporting event has exceeded its programmed time slot, with such information being included in the set of EPG data extracted from the content. EPG information may be in, for example, DVB-EIT tables in Europe, or ATSC EIT information in the United States, or other formats used by various media providers and media sources 150. Upon extracting and processing the EPG information, the content capture application 154 can store the relevant EPG metadata and information in an EPG metadata repository 176 within the service information server 134 (or alternatively, a local repository on the capture server 152, e.g., the content metadata repository 156). In general, information is sent from the capture server 152 to the service information server as illustrated by arrow 159.

Information from the media sources 150 can also be analyzed and/or processed by the ad detection server 160. In general, the ad detection server 160 detects advertisements included within the media source stream when they are broadcast. In some instances, an ad detection server 160 may be associated with each capture server 152, wherein the information extracted by the content capture application 154 is then passed to the ad detection server 160 to perform its own processing of the information. Alternatively, the media source content may be simultaneously or concurrently sent to the ad detection server 160 to perform the ad detection and recognition functionality of the server 160, while the capture server's 152 components perform their functionality. Still further, the functionality of the ad detection server 160 (of which there may be many) may be included with or a part of the functionality and operations performed on the one or more capture servers 152.

The ad detection server 160 can include several components, including an ad capture application 162, an ad detector application 164, and an ad audio fingerprint repository 166. In general, the ad capture application 162 may perform similar operations to the content capture application 154, by creating an audio fingerprint of the audio portion of the captured media. In some instances, the content capture application 154 may share the audio fingerprint generated at the capture server 152, thereby possibly eliminating duplicative functionality between the two components. Once the audio fingerprint of the captured media is available, the ad detector application 164 can compare the audio fingerprint of the captured media to one or more repositories of audio fingerprints associated with "known" ads, including the local ad audio fingerprint repository 166. Further, the ad detection server 160 may also store or be associated with one or more video fingerprints associated with the various known ads, which can be used in associated with video fingerprints generated from media captured from the transport stream in order to improve accuracy of known ad matches. If the audio fingerprint (and, in some instances, the video fingerprint) of the currently captured media matches a known ad, a unique identifier associated with the ad can be returned to the match service 122 when a query is requested. In those cases, a set or sets of ad-related metadata may be stored in the service information server 134, allowing connections between the identified ad content and the stored metadata to be used in generating a set of search results to a query. Additionally, specific information associated with a particular known ad may be available in the service information server 134, such as links to a company's website, additional product information, and other relevant information. This ad-specific information can be stored in the content-specific information repository 170, and used or included within the results whenever the audio sample captured at the client device 104 is determined to be a known ad. The use of audio and video fingerprints to identify known ads provides better accuracy, and allows the ad detection server 160 to compare the video and audio streams of the captured media (i.e., the live broadcast) to determine whether the content currently being aired on a particular channel is an advertisement or not. When a query is received from the client device 104, and if the audio fingerprint associated with the audio sample received from the client device matches content associated with a particular channel, then the knowledge that the channel is showing an advertisement at the time of the client device's 104 query can be used when generating search results for the client device 104.

The ad detection server 160, and as illustrated, the ad detector application 164, can also determine whether certain captured content is associated with or is an advertisement. In one example, the ad detector application 164 may be detected using a repetition pattern algorithm to identify particular captured content as an advertisement. Once a new advertisement is identified, any additional information available from the content stream can be used to generate metadata associated with the identified advertisement, for instance, using the ad capture application 162. For instance, still images from the video stream associated with the advertisement can be processed by the image analysis server 155 such that one or more video-based keywords are generated and subsequently stored at the service information server 134. In some instances, the ad capture application 162 can perform an OCR of the images or subtitles associated with the advertisement to obtain advertisement-specific information that can be included in the current and future search results when the audio sample captured at the client device 104 corresponds to the identified advertisement. Additionally, the ad capture application 162 can also generate a video fingerprint associated with the captured advertisement content, which can be used to increase the accuracy of advertisement matches. Information retrieved by the ad capture application 162 can be passed to or stored at the corresponding repository of the service information server 134 (as illustrated by arrow 167).

The service information server 134, as described, is used to store contextual data, such as metadata and content-specific information, associated with the captured media. The service information server 134 can include repositories storing any suitable information associated with captured media. Further, additional types of metadata other than those illustrated within the service information server 134 can be stored. In some instances, the various types of metadata can be collected in a single repository instead of the plurality of repositories displayed in FIG. 1. The service information server 134 may store information for a certain amount of time (in some cases, depending on the corresponding content type) before archiving the information in an archive or other storage repository. For example, in order to optimize the system for results associated with live television broadcasts, information may only be stored on the service information server 134 for a relatively short period of time before it is archived. In some instances, this time period may be several minutes, several hours, or any suitable length of time. In some instances, information may be stored for longer periods of time in order to allow time-shifted content (i.e., recorded content) to be included in the system. Additionally, more than one service information server 134 can be used, with different servers 134 storing information at different intervals. In that manner, recorded media, such as DVDs and Blu-rays, can be used with the present system 100 even though specific media source 150 is not a live (or time-shifted) broadcast of the media stream. In this manner, the limitations of the system 100 may be determined based on the storage capacity of the plurality of service information servers 134 and the intended use of the system 100 in general (i.e., limited to live television broadcasts, or inclusive of all possible media types). As previously described, the service information server 134 can include the data manager 168 to retrieve information responsive to and associated with queries and searches based on a particular content identifier. Further, the various audio fingerprints of the system may also be stored within the service information server in alternative embodiments.

While FIG. 1 is described as containing or being associated with a plurality of components, some implementations may not include all components illustrated within the illustrated implementation of FIG. 1. Additionally, one or more of the components described herein may be located external to system 100, while in other instances, certain components may be included within or as a portion of one or more of the other described components, as well as other components not described. Further, certain components illustrated in FIG. 1 may be combined with other components or perform certain functionality of one or more other components, as well as used for alternative or additional purposes, in addition to those purposes described herein.

Figure 2:
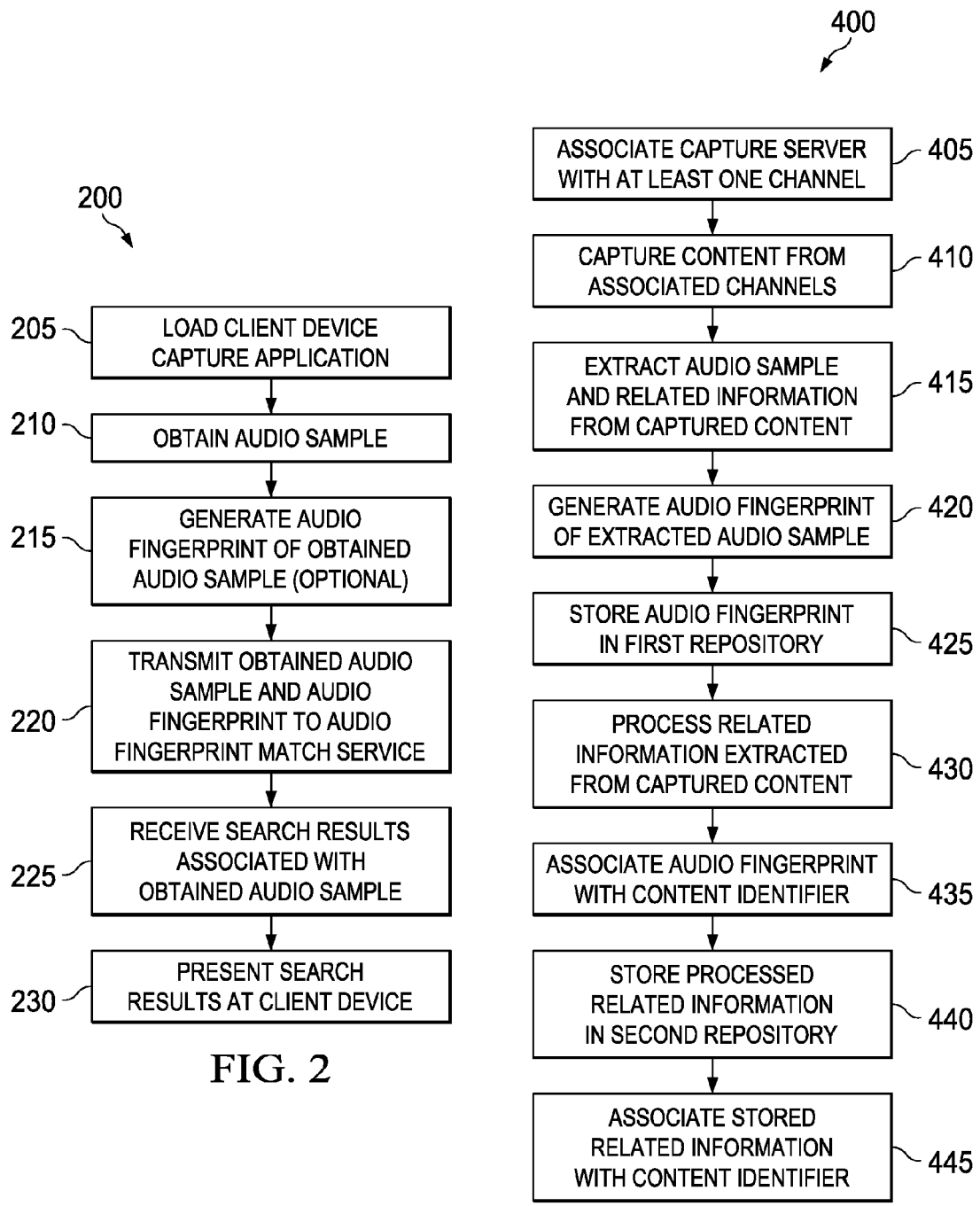
FIG. 2 is a flowchart illustrating an example method for performing an audio-based search request from a client device.

FIG. 2 is a flowchart illustrating an example method 200 for performing an audio-based search request from a client device. For clarity of presentation, the description that follows generally describes method 200 in the context of system 100 illustrated in FIG. 1. However, it will be understood that method 200 may be performed, for example, by another system, environment, or combination of systems and environments.

At 205, the client device loads a local audio capture application. In some instances, the audio capture application may be loaded (or initialized) from a start or home screen displayed on the client device. Once the audio capture application is loaded, an audio sample is obtained at 210. In some instances, ambient audio can be captured and recorded by the client device using a microphone, an audio receiver, or other audio-based input. In one example, the captured audio may be associated with live television programming.

In some instances, the audio captured by the audio capture application may be captured from the client device itself, such as when the client device is streaming online or Internet-based video or audio, as well as when the client device is the source of the local media being captured. The client device may be a mobile device (e.g., a smart phone, a tablet PC, etc.), while it also may be a standalone device, including a set-top box associated with or directing the presentation of video, audio, and other suitable multimedia. In some instances, obtaining the audio sample may also include providing a prerecorded audio sample stored on the client device to the audio capture application.

In some implementations, the client device can generate an audio fingerprint of the obtained audio sample using any suitable audio fingerprinting algorithm and process at 215. Alternatively, the client device may not perform the audio fingerprinting, allowing the back-end system to perform those functions. In either situation, the obtained audio sample and/or the audio fingerprint are sent to an audio fingerprint match service or system at 220. Again, the client device may send only the raw audio sample recorded or obtained at 210, or the client device may send an audio fingerprint of the audio sample. In some instances, 220 is performed automatically after the audio sample is obtained (and the audio fingerprint is generated, if done at the client device). Therefore, the process of requesting a search be performed on captured audio may require a single click or action on the client device. As described here, the initial loading or activation of the audio capture application may be the one action required by a user to begin the non-keyword, audio sample-based search. Further, in some instances, various methods of audio compression may be applied by the client device prior to sending the audio sample (and the audio fingerprint) in order to minimize the required data. Additionally, silent portions of the audio sample may be removed, where applicable, to reduce the audio sample file size. Additionally, the client device may include certain user or client device information with the transmitted audio sample, including user profile information, client device location information, user preferences, and other information that can be used to enhance and focus the search associated with the audio sample. By including the client device's location information (using global positioning system (GPS) information, information retrieved from cellular or wireless communications associated with the client device, or information supplied by or derived from the user or client device, such as a location determination using geo-location services based on the client device's IP address), the potential broadcasts captured at the client device can be filtered such that only a portion of the possible results are searched and returned. For example, a search from a client device in the United States may not access or attempt to search content associated with German broadcast television. In this way, a more efficient search query can be submitted without requiring additional user interaction.

At 225, a set of search results associated with the obtained audio sample are returned to and received by the client device. Generally, the search results can be associated with the broadcast or information corresponding to the obtained audio sample. For instance, if the client device has captured an audio sample from a particular television show, search results and information associated with that show are returned to the client device. Similarly, if a particular advertisement is included in the audio sample, information directed towards the product or service associated with the advertisement can be returned, including information included within the video portion of the advertisement. At 230, the search results are presented at the client device, such as through a web browser associated with the application, as well as a web browser or other functionality included or associated with the local audio capture application.

Although not illustrated in FIG. 2, some client devices may not be able to record or obtain audio samples from a local media source during the requested time. Alternatively, a program or broadcast may be watched with the audio too low for the client device to capture. In those instances, the audio capture application may provide an alternative solution by asking the user to input a particular channel currently being viewed. Using only that information, a search may be sent to the back-end search system that returns search results associated with the current program or broadcast on the channel defined by the user. Additionally, this option may be presented to the user if no audio fingerprints are found to match the audio sample recorded or obtained by the client device.

Figure 3:
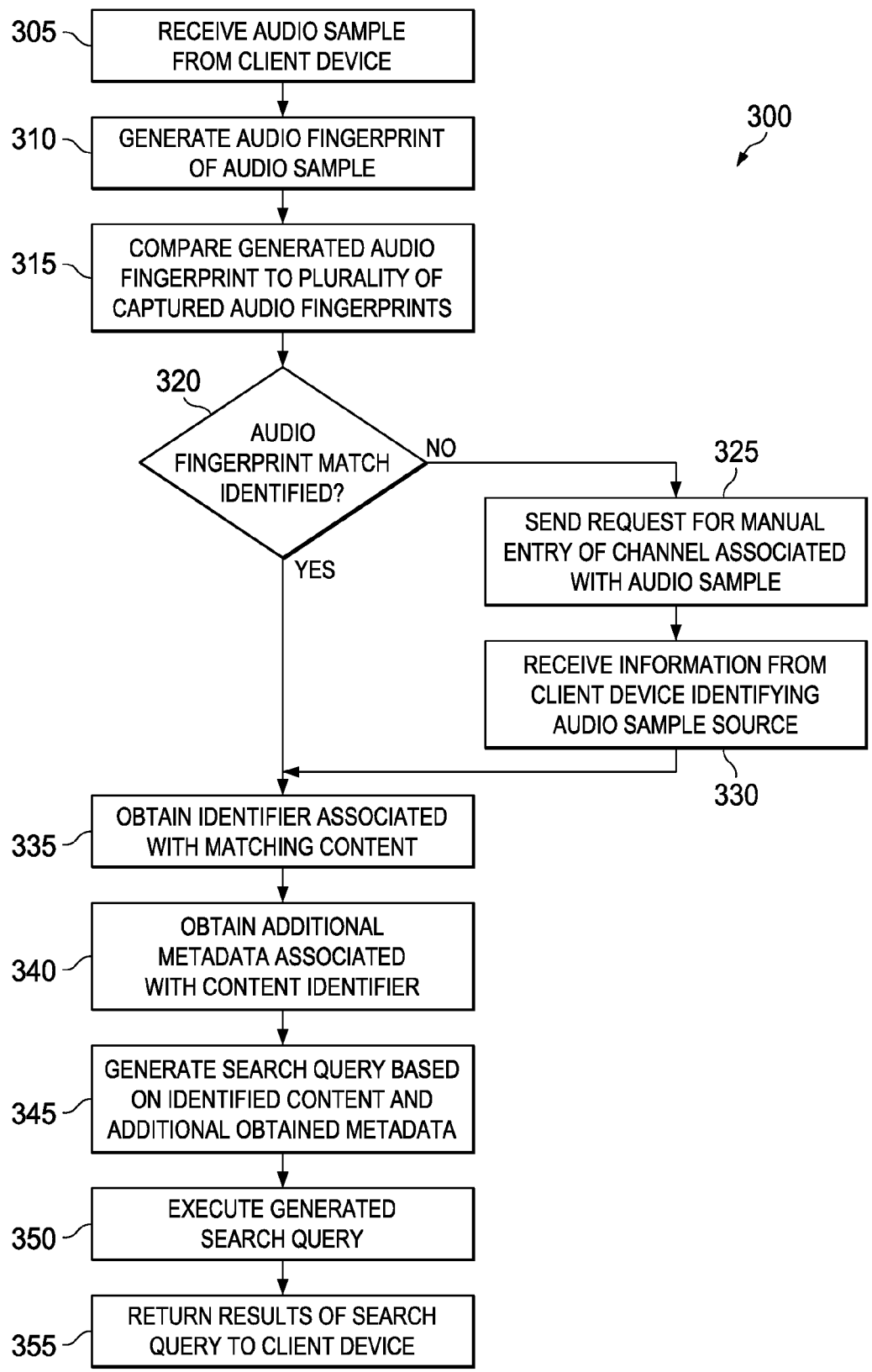
FIG. 3 is a flowchart illustrating an example method for using an audio fingerprint of broadcast information to generate and perform a search for information associated with the broadcast.

FIG. 3 is a flowchart illustrating an example method 300 for using an audio fingerprint of broadcast information to generate and perform a search for information associated with the broadcast. For clarity of presentation, the description that follows generally describes method 300 in the context of system 100 illustrated in FIG. 1. However, it will be understood that method 300 may be performed, for example, by another system, environment, or combination of systems and environments.

FIG. 3 generally illustrates method 300 from the perspective of an entire back-end search system capable of receiving an audio sample from a client device, and based at least in part on the audio sample, identifying captured media content matching and/or associated with the received audio sample, and generating and executing a search query based on information associated with the identified captured media. FIG. 3 is illustrated with the understanding that various types of media have already been captured by the back-end search system. FIG. 4, described below, illustrates an example media capture and processing process that can be used in association with FIG. 3 to provide the corresponding data and information used to identify matching content and generate search queries based on that identification. Additionally, FIG. 1 describes an example system 100 from which the information can be captured.

As shown in FIG. 3, at 305 the back-end search system receives an audio sample from a client device. The back-end search system may be associated with a plurality of client devices, some or each of differing types. At 310, the back-end search system generates an audio fingerprint of the audio sample received from the client device. In some instances, the audio sample received from the client device may include or comprise an audio fingerprint associated with the audio sample generated by the client device.

At 315, the back-end search system compares the generated audio fingerprint to a plurality of audio fingerprints associated with media captured by the back-end system. In some instances, the generated audio fingerprint (associated with the audio sample from the client device) may be compared against a subset of all available audio fingerprints stored or associated with the back-end search system based on one or more characteristics associated with the received audio sample or its associated information. For example, if the received audio sample included location-related information regarding the client device, only audio fingerprints associated with the client device's location may be searched or used to compare with the generated audio fingerprint. Further, the comparison process may initially search a relatively newer set of captured media audio fingerprints. If no match is found, the comparison process may continue to compare the generated audio fingerprint to relatively older sets of captured media audio fingerprints. In some instances, different types of repositories associated with captured media audio fingerprints may be used in the comparison by the back-end search system. For instance, a set of captured media audio fingerprints and a set of known advertisement audio fingerprints may both be used for the comparison in some instances. The back-end search system may use a specialized application or service to perform the audio fingerprint comparison, such as the match service 122 as illustrated in FIG. 1.

At 320, a determination is made whether an audio fingerprint match is identified by the fingerprint comparison. If no match is identified, the process may be retried, or different or additional audio fingerprint repositories or subsets thereof may be used in the comparison. If still no match is identified, a request for the manual entry of a channel associated with the audio sample can be requested at 325. This request may be used when the received audio sample received from the client device does not provide any match, such as when the audio sample is of low quality, or disturbed by additional ambient noise in the receiving environment. By requesting the particular channel or broadcast, the back-end search system can provide for manual identification of the general channel associated with the received audio sample, and determine the associated content based on that information. The information received from the client device identifying the audio sample source (i.e., the channel or broadcast associated with the audio sample) can then be used to identify the corresponding captured content.

If an audio fingerprint match is identified at 320, or if specific content is identified based on the information received at 330, the back-end search system obtains an identifier of the content associated with the matching audio fingerprint at 335. In some instances, each captured media audio fingerprint may be associated with a unique identifier, such as a content ID, that can be used to correlate any additional data or metadata associated with the matching content. Additionally, if a manual selection of a particular source is received (via the operations of 325 and 330), the selected channel or broadcast can be used along with additional information provided by the client device to identify content broadcast at the time at which the original client device request was sent. By cross-referencing the timing and the contextual information from the client device, a particular content identifier associated with specific content can be obtained.

Using the obtained content identifier, the back-end search system can obtain additional metadata and other information associated with the content identifier at 340. For instance, FIG. 1 illustrates that the service information server 134 includes various repositories of metadata associated with the captured media. Each entry in those metadata repositories can be associated with a particular content identifier, so that when the content identifier is known, additional information and metadata can be gathered. The additional metadata can be retrieved from any suitable location, and any method of querying the metadata repositories (or other storage structures) can be used to find the information associated with the content identifier.

At 345, the back-end search system generates a search query based at least in part on the identified content and the additionally obtained metadata. In some instances, a query generator can combine the information obtained in previous operations (such as the metadata information associated with the identified content) to generate a search query associated with the audio sample received from the client device. The search query can be generated using any suitable search query generation process, with various weights provided to the information associated with the identified content. Additionally, any search results can be weighed based on information provided by the client device or a user associated with the client device to provide personalized search results.

Once the search query is generated, the search query may be executed by the back-end search system at 350. In some instances, such as that of FIG. 1, the search query may be passed to a search engine, which can then execute the generated query. At 355, a set of results associated with the executed search query are returned to the back-end search system, and subsequently, to the client device. In some instances, some information retrieved at 340 may be automatically included in the set of results returned to the client device. For instance, sponsored information associated with a particular program or broadcast may be included within the search results if the audio sample received from the client device corresponds to a predefined program.

FIG. 4 is a flowchart illustrating an example method 400 for capturing broadcast information and populating repositories of audio fingerprints and content-related metadata. For clarity of presentation, the description that follows generally describes method 400 in the context of system 100 illustrated in FIG. 1. However, it will be understood that method 400 may be performed, for example, by another system, environment, or combination of systems and environments.

FIG. 4 generally illustrates the process associated with capturing live and/or recorded broadcast information from one or more media source streams, including extracting audio and other related information from the streams to allow for detailed sets of information to be derived and associated with a particular set of captured media. As described above, the information captured and extracted is used to perform non-keyword-based searches associated with audio samples recorded at a client device. In order to provide these searches, method 400 can include a set of operations that allow detailed information and metadata to be associated with various audio samples, and subsequently used in generating search queries in response to identifying matching audio samples (or matching fingerprints of the audio samples).

At 405, a capture server is associated with at least one broadcast channel or other media source. For instance, a capture server can be associated with one or more digital television channels at a time. Multiple capture servers may be applied in various systems, and can be associated with any number of media sources. In some instances, capture servers may be used to capture information associated with material from DVDs and Blu-rays, as well as from streaming, online content. In some those instances, the capture process may only need to be performed once, as information from these sources may remain the same no matter when a client device captures audio samples associated therewith. Alternatively, the capture servers may continuously and/or in real-time capture various media source streams as they broadcast multimedia content.

At 410, the capture servers can capture content from the channels with which the servers are associated. In other words, the content broadcast by the one or more associated channels or broadcast sources are collected and prepared for processing by the capture servers. For example, at 415 audio samples associated with captured content are extracted from the media source stream, as well as other related information. The additional information associated with the captured content can include any information included in or derivable from the captured content, and may be different based on the type of media source with which the capture server is associated, as well as the type of captured media. For television programming, the media source stream can be extracted to retrieve an audio stream, a subtitle stream, a video stream, and EPG data. Additionally, information associated with the specific channel being broadcast can be extracted, including, for example, a channel name and a channel genre (e.g., sports, news, etc.). For a radio broadcast, an audio stream, along with other information encoded in the signal, may be extracted. Additionally, the audio stream of any media source may be processed by a speech-to-text processor to allow subtitles or text of the content to be collected. Returning to the television (or any video-based programming or broadcasts), images taken from the video stream may be processed by an image analysis server (such as 155 of FIG. 1) to extract and/or generate additional information associated with the content.

At 420, an audio fingerprint of the audio sample extracted from the captured content is generated. As previously described, any suitable method for generating the audio fingerprint may be used. At 425, the generated audio fingerprint is stored in a first repository. At 430, the generated audio fingerprint is associated with a content identifier. The content identifier may be any unique identifier that allows the generated audio fingerprint to be associated with the additional information extracted from the captured media. For example, if subtitles are extracted from the captured media, any information or metadata associated with the subtitles can be associated or embedded with the content identifier.

At 435, the additional information extracted and/or derived from the captured media is processed to generate one or more sets of metadata to be associated with and describing the captured media. As described in regards to FIG. 1, the subtitle stream may be processed by performing an OCR operation on the subtitle bitmap. Additionally, any images associated with the video stream may be used or further processed to generate video-based keywords associated with the captured content. Any additional information or data extracted from the captured media can be similarly processed into contextual metadata associated with the captured media and to be associated with any identified content.

At 440, the processed set of related information is stored in a second repository. As illustrated in FIG. 1, each type of extracted and processed information can be stored in a different repository, such as the video-based keyword metadata repository 174, the subtitle metadata repository 172, and the EPG metadata repository 176, as well as any other suitable repository or storage location. At 445, each set of information stored in those repositories can be associated with the content identifier. Therefore, using FIG. 3 as an example, when an audio fingerprint generated from an audio sample recorded at the client device is received and matched to an audio fingerprint associated with some captured content, the content identifier associated with that matching audio fingerprint can be used to retrieve any metadata or other content associated with that content identifier.

FIG. 5 is an example illustration 500 of search results provided to a client device 505 on a continuous or periodic basis using one or more example methods of the present disclosure. In other words, an alternative embodiment of the present disclosure also includes a "continuous" mode of operation where the client device 505 continuously, or at regular intervals, records and transmits captured audio from a broadcast source 502 to the back-end search system, allowing for results to be continually provided to the client device 505 as new information and content is recorded and transmitted to the search system. In such embodiments, once a client audio capture application associated with the client device 505 is loaded or launched, the capture application can continuously (or periodically) record audio samples from the broadcast source 502 and transmit the audio samples to the back-end search servers, thus allowing for multiple searches to be performed on sequentially recorded sets of audio obtained by the client device 505. Therefore, corresponding results may be continuously or periodically pushed, or returned, to the client device 505 and displayed on a graphical user interface associated with the client device's capture application.

As additional results are received from the back-end search system, the list of results displayed on the client device 505 can be continuously or periodically updated to correspond to the current broadcast source 502. Additionally, should the end user change the broadcast source 502 associated with the client device 50 (e.g., changing of a television channel or a radio station, moving from a first type of media, such as television, to a second type of media, such as online streaming video, etc.), updated searches can be performed with results associated with the new broadcast source 502 displayed on the client device 505.

Using the audio samples received from the client device, the back-end search system can be used (as described in the present disclosure or any other suitable alternative) to identify the content and context associated with each received audio sample, including people, locations, news stories, products, and other information mentioned or associated with the channel or broadcast source's most recent (and captured) audio. Using the identified content and contextual information, the back-end search system can generate a relevant search query and identify one or more search results associated with each set of received audio samples. In some instances, the one or more search results may include a top search result from a general search engine, a related news story associated with an online news source, a link to a map or information associated with a location associated with the content of the captured audio sample, a link to a product discussed or associated with the audio sample, or any other information related to the identified content. Further, the identified genre associated with the captured broadcast source 502 may be used to determine a subset of information to search. For instance, a news program may result in news search results being weight heavier than other search results, while a product-related program may result in product and shopping-related search results being weighed heavier. In some instances of the continuous or periodic embodiment, the number of search results returned for each particular audio sample may be limited in order to allow for search results from over a time interval (e.g., associated with multiple sets of captured audio) to be presented on the client device 505.

As illustrated in FIG. 5, the client device 505 can display new search results (515a-d) as they are returned by the back-end search system, as well as a channel or broadcast source identifier 510. For example, FIG. 5 illustrates search results associated with a newscast, with each search result (515a, 515b, 515c, and 515d) corresponding to different stories included in the viewed broadcast. As new search results are generated and returned by the back-end search system, the new result (515a) can be inserted at the top of the search results list, thereby continuously updating the search results as new or additional searches are performed. In instances where the channel or broadcast source is changed while the application is executing, the channel or broadcast source identifier 510 may be changed accordingly. Alternatively, a second channel or broadcast source identifier can be inserted at the top of the search results page, with the original channel or broadcast source identifier being moved lower on the search results list. Results associated with the second channel or broadcast source can be shown below the second broadcast source identifier and above the original channel or broadcast source identifier in order to differentiate between search results associated with the different broadcast sources.

While the present disclosure uses a plurality of flowcharts and accompanying descriptions to illustrate the example techniques associated with various methods of FIGS. 2, 3, and 4, system 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flowcharts may take place simultaneously and/or in different orders than as shown and described. Moreover, system 100 may use processes and methods with additional, fewer, and/or different steps, so long as the processes and methods remain appropriate.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    receiving, by the one or more computers, audio data from a client device;
    determining, by the one or more computers, specific content from captured media that matches the received audio data, wherein the captured media is captured from one or more media sources at a backend system and includes at least one of audio media or audio-video media, and wherein determining the specific content that matches the received audio data includes identifying an advertisement that is (i) included within the captured media and (ii) included within the media programming associated with the received audio data, wherein the captured media comprises a collection of audio fingerprints stored in an audio fingerprint repository, wherein each audio fingerprint is generated from at least a portion of an audio stream extracted from one or more monitored digital television broadcast channels;
    obtaining, by the one or more computers, additional information associated with the advertisement included within the media programming associated with the received audio data;
    generating, by the one or more computers, a search query based at least in part on the obtained additional information associated with the advertisement included within the media programming associated with the received audio data; and
    returning, by the one or more computers, one or more search results to the client device responsive to the search query.

2. The method of claim 1, wherein client device comprises one of one of a mobile phone, a smartphone, a laptop, a network, or a tablet PC.

3. The method of claim 1, wherein the client device includes a set-top box associated with a presentation of audio media or audio-video media.

4. The method of claim 1, wherein the audio data received from the client device includes an audio fingerprint of media recorded at the client device.

5. The method of claim 1, further comprising obtaining an audio fingerprint of the received audio data.

6. The method of claim 1, further comprising:
    deriving at least one additional set of information associated with each extracted audio stream;
    generating at least one set of content-related metadata associated with each extracted audio stream based on the derived at least one additional set of information;
    associating each of the at least one set of content-related metadata with the unique content identifier associated with the generated audio fingerprint associated with the corresponding extracted audio stream; and
    storing each of the at least one set of content-related metadata in a metadata repository.

7. The method of claim 6, wherein:
identifying specific content from captured media includes:
matching an audio fingerprint generated from the audio data received from the client device with at least one audio fingerprint stored in the audio fingerprint repository, and
identifying the unique content identifier associated with the at least one audio fingerprint stored in the audio fingerprint repository; and
obtaining additional metadata associated with the identified content includes retrieving content-related metadata associated with the identified unique content identifier from the metadata repository.

8. The method of claim 1, wherein the advertisement is identified as an advertisement using a repetition pattern algorithm during analysis of the captured media.

9. The method of claim 1, wherein determining the specific content from the captured media that matches the received audio data comprises determining that at least a portion of the received audio data matches audio data of the advertisement.

10. The method of claim 1, wherein obtaining the additional information comprises obtaining metadata derived from the advertisement included within the media programming associated with the received audio data; and
wherein generating the search query comprises generating the search query based at least in part on the metadata derived from the advertisement included within the media programming associated with the received audio data.

11. The method of claim 10, wherein obtaining metadata derived from the advertisement comprises obtaining text of spoken words in the advertisement.

12. The method of claim 1, wherein obtaining metadata derived from the advertisement comprises obtaining metadata derived from an image in the advertisement.

13. The method of claim 1, wherein generating the search query based at least in part on the obtained additional information comprises selecting one or more search terms for the search query based at least in part on the additional information.

14. A system comprising:
one or more computers configured to perform operations comprising:
receiving audio data from a client device;
determining specific content from captured media that matches the received audio data, wherein the captured media is captured from one or more media sources at a backend system and includes at least one of audio media or audio-video media, and wherein determining the specific content that matches the received audio data includes identifying an advertisement that is (i) included within the captured media and (ii) included within the media programming associated with the received audio data, wherein the captured media comprises a collection of audio fingerprints stored in an audio fingerprint repository, wherein each audio fingerprint is generated from at least a portion of an audio stream extracted from one or more monitored digital television broadcast channels;
obtaining additional information associated with the advertisement included within the media programming associated with the received audio data;
generating a search query based at least in part on the obtained additional information associated with the advertisement included within the media programming associated with the received audio data; and
returning one or more search results to the client device responsive to the search query.

15. The system of claim 14, wherein client device comprises one of one of a mobile phone, a smartphone, a laptop, a network, or a tablet PC.

16. The method of claim 14, wherein the client device includes a set-top box associated with a presentation of audio media or audio-video media.

17. The system of claim 14, further configured to perform operations comprising:
deriving at least one additional set of information associated with each extracted audio stream;
generating at least one set of content-related metadata associated with each extracted audio stream based on the derived at least one additional set of information;
associating each of the at least one set of content-related metadata with the unique content identifier associated with the generated audio fingerprint associated with the corresponding extracted audio stream; and
storing each of the at least one set of content-related metadata in a metadata repository.

18. The system of claim 17, wherein:
identifying specific content from captured media includes:
matching an audio fingerprint generated from the audio data received from the client device with at least one audio fingerprint stored in the audio fingerprint repository, and
identifying the unique content identifier associated with the at least one audio fingerprint stored in the audio fingerprint repository; and
obtaining additional metadata associated with the identified content includes retrieving content-related metadata associated with the identified unique content identifier from the metadata repository.

19. The system of claim 14, wherein the advertisement is identified as an advertisement using a repetition pattern algorithm during analysis of the captured media.

20. A non-transitory computer-readable storage medium encoded with a computer program, the program comprising instructions that when executed by one or more computers cause the one or more computers to perform operations comprising:
receiving audio data from a client device;
determining specific content from captured media that matches the received audio data, wherein the captured media is captured from one or more media sources at a backend system and includes at least one of audio media or audio-video media, and wherein determining the specific content that matches the received audio data includes identifying an that is (i) included within the captured media and (ii) included within the media programming associated with the received audio data, wherein the captured media comprises a collection of audio fingerprints stored in an audio fingerprint repository, wherein each audio fingerprint is generated from at least a portion of an audio stream extracted from one or more monitored digital television broadcast channels;
obtaining additional information associated with the advertisement included within the media programming associated with the received audio data;
generating a search query based at least in part on the obtained additional information associated with the advertisement included within the media programming associated with the received audio data; and returning one or more search results to the client device responsive to the search query.

\* \* \* \* \*